US008170896B2

(12) United States Patent
Mangtani et al.

(10) Patent No.: US 8,170,896 B2
(45) Date of Patent: May 1, 2012

(54) SYSTEM AND METHOD FOR ELECTRONIC BUSINESS TRANSACTION RELIABILITY

(75) Inventors: Komal Mangtani, Santa Clara, CA (US); Michael Blevins, Volcano, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2146 days.

(21) Appl. No.: 10/428,880

(22) Filed: May 2, 2003

(65) Prior Publication Data

US 2003/0208374 A1    Nov. 6, 2003

Related U.S. Application Data

(60) Provisional application No. 60/377,309, filed on May 2, 2002.

(51) Int. Cl.
*G06Q 10/00* (2012.01)
(52) U.S. Cl. ...... 705/7.13; 705/7.27; 709/201; 718/100; 718/106
(58) Field of Classification Search ............. 705/8, 7.13, 705/7.27; 709/201; 718/100, 106
See application file for complete search history.

(56) References Cited

U.S. PATENT DOCUMENTS

| 3,956,615 | A   | * | 5/1976 | Anderson et al. | 705/72     |
|-----------|-----|---|--------|------------------|------------|
| 5,751,958 | A   |   | 5/1998 | Zweben et al.    | 395/200.34 |
| 6,266,340 | B1  |   | 7/2001 | Pickett et al.   | 370/442    |
| 6,510,439 | B1  |   | 1/2003 | Rangarajan et al.| 702/201    |
| 6,915,274 | B2  | * | 7/2005 | Abhyanker        | 705/26     |
| 7,249,069 | B2  | * | 7/2007 | Alie et al.      | 705/28     |
| 2002/0013722 | A1 | * | 1/2002 | Kanaga        | 705/8  |
| 2002/0040304 | A1 | * | 4/2002 | Shenoy et al. | 705/1  |
| 2002/0120537 | A1 | * | 8/2002 | Morea et al.  | 705/35 |
| 2002/0156688 | A1 | * | 10/2002| Horn et al.   | 705/26 |
| 2002/0156693 | A1 | * | 10/2002| Stewart et al.| 705/26 |
| 2002/0161707 | A1 | * | 10/2002| Cole et al.   | 705/42 |
| 2002/0188653 | A1 | * | 12/2002| Sun           | 709/201|
| 2003/0018563 | A1 | * | 1/2003 | Kilgour et al.| 705/37 |

OTHER PUBLICATIONS

Angelov, S; Grefen P; "B2B eContract Handling—A Survey of Projects, Papers and Standards", 2001, University of Twente, The Netherlands, ub.utwente.nl, pp. 1-69.*
Clarke, Roger; "Towards a Taxonomy of B2B e-Commerce Schemes", Feb. 12, 2001, 14th International e-Commerce Conference, pp. 1-23.*
S. Lelieveldt Consultancy, "Research study on the integration of e-payments into the online transaction process", Dec. 12, 2001, Amsterdam, pp. 1-57.*
Franzke, Dr. Ekkehard; Buschmann, Oliver; "The Future of B2B Marketplaces", Dec. 2000, presentation in Munich, Germany, Bain & Company, pp. 1-35.*
RosettaNet; "RosettaNet Implementation Framework: Core Specification", © 2001 RosettaNet, pp. 1-140.*
Shim, et.al.; "Business-to-Business e-Commerce Frameworks", © 2000, Computer, IEEE, pp. 40-47.*

(Continued)

*Primary Examiner* — Jonathan G Sterrett
(74) *Attorney, Agent, or Firm* — Fliesler Meyer LLP

(57) ABSTRACT

A system and method for performing a business transaction including delivering a business message, comprising providing in a first transaction the business message to a first workflow process; transferring the business message from the first workflow process to a second process wherein the transfer is not part of the first transaction; wherein the business message is transferred to the second process using a protocol; and wherein transferring the business message to the second process will be successful even if the first workflow process abnormally terminates.

19 Claims, 6 Drawing Sheets

OTHER PUBLICATIONS

Radek Vingralek; "Supporting E-commerce in Wireless Networks", Oct. 2001, InterTrust Star Lab, Technical Report STAR-TR-01-07, pp. 1-7.*

Mohan, C; "Tutorial: Advanced Transaction Models—Survey and Critique", IBM Almaden Research Center, San Jose, CA, Jun. 29, 1995, pp. 1-29.*

"The escrow transactional method"—PE O'Neil—ACM Transactions on Database Systems, 1986—portal.acm.org.*

Extremal scheduling of parallel processing with and without real-time constraints F Baccelli, Z Liu, D Towsley—Journal of the ACM (JACM), 1993—portal.acm.org.*

Cummings et al., Simulation and Synthesis Techniques for Asynchronous FIFO Design with Asynchronous Pointer Comparisons, SNUG San Jose 2002.*

Wikipedia definition of FCFS (first come first served) and FIFO in computing with references to articles published in 1987 and 2002.*

The transaction concept: Virtues and limitations J Gray—Proceedings of the Very Large Database Conference, 1981—infolab.usc.edu.*

\* cited by examiner

SYSTEM AND METHOD FOR ELECTRONIC BUSINESS TRANSACTION RELIABILITY

CLAIM OF PRIORITY

This application claims priority from the following application, which is hereby incorporated by reference in its entirety:

HIGHLY-AVAILABLE INTEGRATION COMPONENTS, U.S. application Ser. No. 60/377,309; Inventor: Komal Mangtani, filed on May 2, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to increasing the reliability of electronic business transactions.

BACKGROUND

Enterprises strive to integrate, automate and streamline internal and external business processes to improve their performance in today's dynamic business-to-business (B2B) electronic commerce (e-commerce) environment. Processes such as procurement, sales, order fulfillment and customer service are typical examples of processes suitable for B2B integration. These processes drive a company's e-commerce interactions with their customers, partners, distributors, and suppliers; they can also streamline the company's internal business. Software frameworks for B2B integration can support these process by providing workflow processing, messaging and enterprise application integration. However, the value of a B2B framework is diminished without robust methods for handling hardware and software faults as they arise.

DETAILED DESCRIPTION

Figure 1:
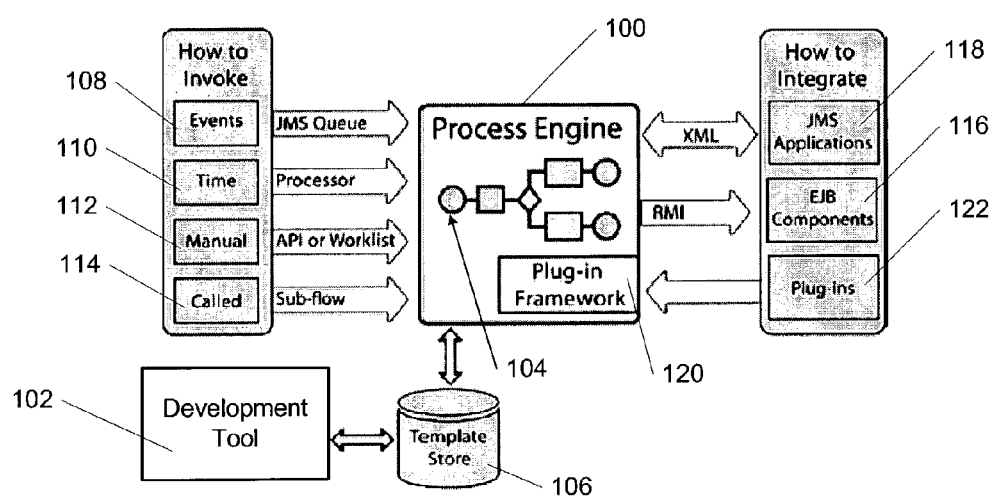
FIG. 1 is an illustration of business process management functionality in an embodiment of the invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Various embodiments will be illustrated in terms of exemplary classes and/or objects in an object-oriented programming paradigm. It will be apparent to one skilled in the art that the present invention can be practiced using any number of different classes/objects/interfaces, not merely those included here for illustrative purposes. Furthermore, it will also be apparent that the present invention is not limited to any particular software programming language or programming paradigm.

One embodiment is an XML (eXtensible Markup Language) and Java™-based e-commerce platform that facilitates e-commerce on the World Wide Web. XML is a text-based language for describing data in a machine-independent way. The XML specification is available from the World Wide Web Consortium (http://www.w3.org). Java is an object-oriented programming language and run-time environment available from Sun Microsystems, Inc. of Mountain View, Calif. One embodiment includes a software framework and a set of services built on top of an application server, such as the BEA WebLogic Server® available from BEA Systems, Inc. of San Jose, Calif.

The basic building blocks of B2B e-commerce are software applications that create interactions among business partners. The term "partner" for purposes of this discussion is synonymous with the B2B software applications that a given partner uses to carry out e-commerce transactions. A partner interacts with one or more other partners to form an e-commerce community. By way of a non-limiting example, partners in an e-commerce community can represent large enterprises or small divisions within an enterprise. An e-commerce community can: 1) exist entirely within a company, spanning multiple corporate departments (e.g., the business purpose for such a community might be inventory management); 2) span multiple companies across firewalls and over a network such as the Internet (e.g., the business purpose might be supply chain management or multi-step purchasing interactions); and 3) include business partners both within a company and in other companies (e.g., one or more of the business partners within a company communicates with business partners in other companies across a network).

In one embodiment, partners can participate in a business conversation. A business conversation is a sequence of one or more business messages exchanged between business partners. In one embodiment, a business message can contain one or more XML documents, one or more attachments, and/or any combination of these. The exchange of business messages is determined by roles business partners play in a conversation. In one embodiment, a conversation can be associated with a unique name and version, and can define two or more roles to be used by business partners in a conversation. A conversation can also be associated with any communication protocol that supports a conversation identifier and/or a message identifier (e.g., ebXML, RosettaNet, etc.). It will be appreciated that the present disclosure is not limited to any particular communication protocol. A business partner can be configured to communicate directly with other business partners in a peer-to-peer mode, through an intermediary in a hub-and-spoke mode, or both. The different configuration modes allow for either direct or mediated messaging among business partners. An intermediary in the message flow can perform tasks such as routing and filtering of messages, or it can provide services to the business partners in the conversation.

FIG. 1 is an illustration of business process management functionality in one embodiment of the invention. BEA WebLogic Integration™ software available from BEA Systems, Inc. is a commercial implementation of such a system. Although this diagram depicts objects as functionally separate, such depiction is merely for illustrative purposes. It will be apparent to those skilled in the art that the objects portrayed in FIG. 1 can be arbitrarily combined or divided into separate software, firmware or hardware components. Furthermore, it will also be apparent to those skilled in the art that such objects, irregardless of how they are combined or divided, can execute on the same computing device or can be arbitrarily distributed among different computing devices connected by a network.

A process engine 100 manages the run-time execution of business processes for a business partner. In one embodiment, the process engine is Java-based and multi-threaded. Visual development tool 102 can used to design business processes. The development tool can provide a graphical user interface in which familiar flowchart elements can be employed to create a workflow 104. In one embodiment, a workflow is an automated business process through which information is communicated to the right participant at the right time according to a set of intelligent business rules that allow computing devices to carry out business transactions. To create a workflow using the development tool, a user identifies required elements and defines the process flow by arranging the flowchart elements (or nodes) into a proper logical sequence. This sequence can then be saved as a workflow template definition in template storage 106. Workflow templates can be given meaningful names such as "Billing" and "Order Processing".

A workflow template can be invoked or executed through a number of mechanisms, including but not limited to Java Message Service (JMS) 108, timers 110, manually via an application program interfaces or from a work list 112, or from another workflow 114 (as a sub-workflow). JMS is available from Sun Microsystems, Inc. Once a template is invoked, the process engine instantiates it by activating the workflow's Start node. The Start node can initialize variables and activate any successor nodes (per the sequence specified in the development tool). When a node is activated, it is evaluated based on its type according to the rules in Table 1. As part of its activation, a node may evaluate actions, such as integrating with external software (e.g., when an action invokes an Entity JavaBean™ method 116 or sends an XML message to another application 118). Once a node has completed its actions, it activates the next node(s) in the sequence based on its evaluation rules and the sequence specified in the Development tool.

A plug-in framework 120 supports the development of plug-ins. Plug-ins 122 extend the process engine functionality. In one embodiment, a plug-in can implement classes and/or interfaces such that it can integrate with the plug-in framework. A B2B integration plug-in provides workflow actions and extends workflow node properties in the Development tool so that they can be used in a multi-business partner environment. The B2B integration plug-in allows for workflows that implement roles in a conversation based on one or more protocols.

TABLE 1

Workflow Node Types in an Embodiment

| NODE TYPE | EVALUATION RULES |
|---|---|
| Decision | Upon activation, a Decision node first evaluates its condition, executes the appropriate list of true or false actions, and then activates its true or false successor nodes. |
| Done | Upon activation, the Done node executes any associated actions, and marks as complete the current workflow, regardless of whether all Done nodes have been reached. |
| Event | Upon activation, an Event node checks for any addressed messages that may have previously been received, and, if none are found, registers itself in the Event Watch table. Once triggered, an Event node can perform the following tasks:<br>■ Initialize variables<br>■ Execute associated actions<br>■ Activate successor nodes. The activation of successor nodes proceeds according to the rules for each node type. |
| Join | Upon activation by any single incoming path, an OR Join node evaluates the OR condition; upon activation by all incoming paths, the AND Join node evaluates the AND condition. If conditions are met, the Join node activates its successor nodes. |
| Start | Upon activation, a Start node can perform the following tasks:<br>■ Initialize variables<br>■ Execute associated actions<br>■ Activate any successor nodes. The activation of successor nodes proceeds according to the rules for each node type. |
| Task | Upon activation, a Task node executes a list of Activated tasks in sequence. The following summarizes the subsequent actions that may be taken:<br>■ If the task is executed, the Execute actions listed are executed.<br>■ If a task is marked done by an action or API (application program interface) request, the MarkedDone actions are executed.<br>■ If an action marks the workflow as complete, or if it aborts the workflow, no further processing occurs. |

Figure 2:
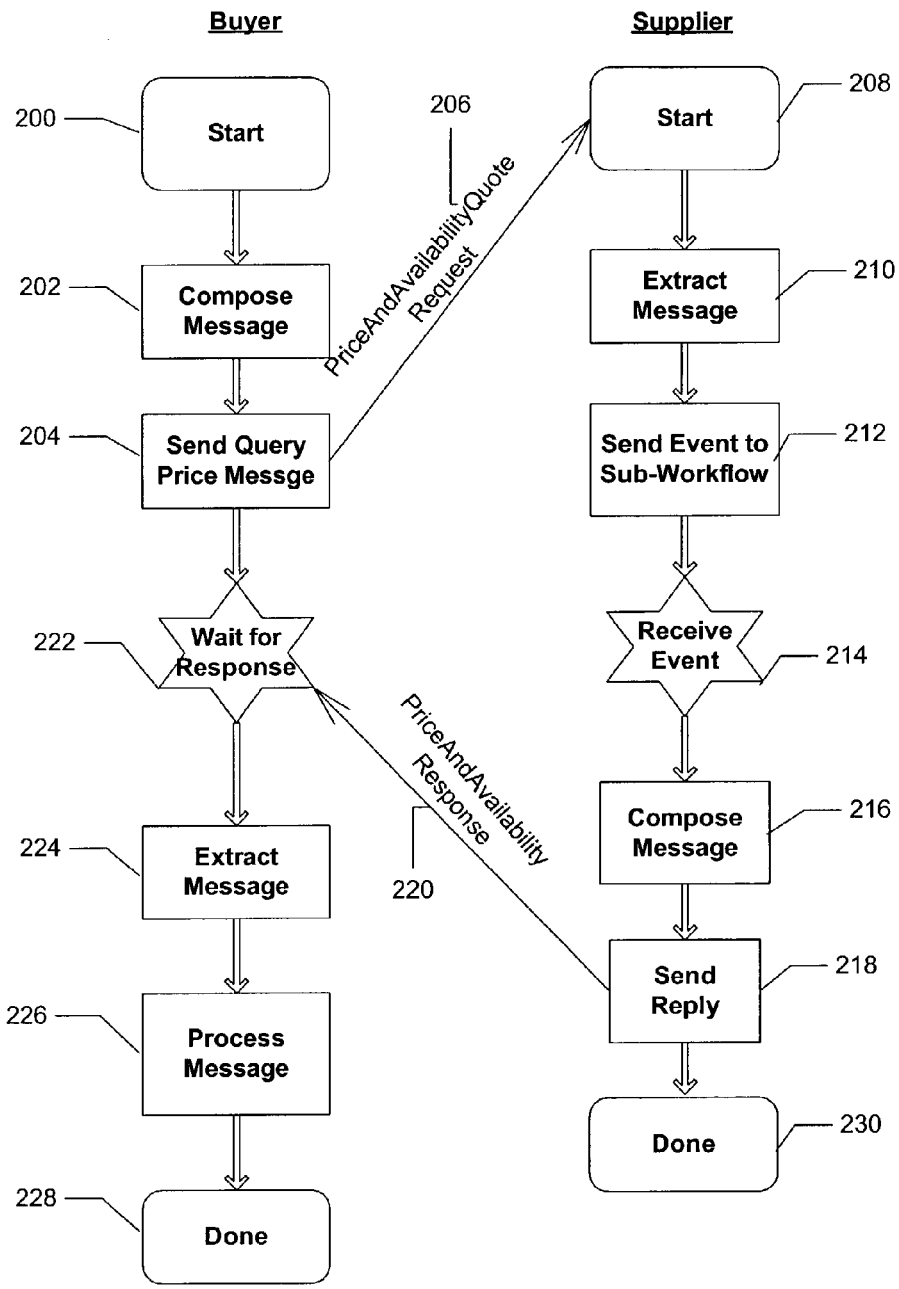
FIG. 2 is an illustration of workflow collaboration in an embodiment of the invention.

A collaborative workflow is a workflow that implements a role for a business partner in a conversation. A conversation may have two or more roles, each of which is associated with a collaborative workflow. FIG. 2 is an illustration of workflow collaboration in one embodiment of the invention. By way of a non-limiting example, there are two participating roles, that of buyer and supplier, and hypothetical workflows for each. The workflows can execute in the same process engine, in different process engines on the same computing device, or in different process engines on different computing devices connected by one or more networks (e.g., Internet, wireless, satellite, etc.).

The buyer's start node 200 is invoked and, after performing any initialization, it activates task node 202 in the sequence.

Node 202 composes a PriceAndAvailabilityQuote request message to send to the supplier. As its name implies, this message requests a price quote and availability information for a particular product carried by the supplier. Node 202 activates task node 204 which sends the message 206 to the supplier. The buyer then waits for a response from the supplier at event node 222. The supplier's workflow start node 208 is invoked when the message is received. Task node 210 extracts the message. A sub-workflow (not shown) is invoked at task node 212 to processes the request. The supplier workflow waits at event node 214 to receive an event from the sub-workflow indicating that the request has been processed. Once the event is received, the supplier composes a response message with the price quote determined by the sub-workflow at task node 216 and then sends the message to the buyer at task node 218. The sender then completes processing at done node 230. Once the message is received by the buyer at node 222, the buyer extracts the message at node task 224, processes it at task node 226 and then completes execution at done node 228. By way of a non-limiting example, processing node 224 might store the price/stock quote in a database, invoke a sub-workflow to further process it, and/or return the information to a form on a web browser.

Figure 3:
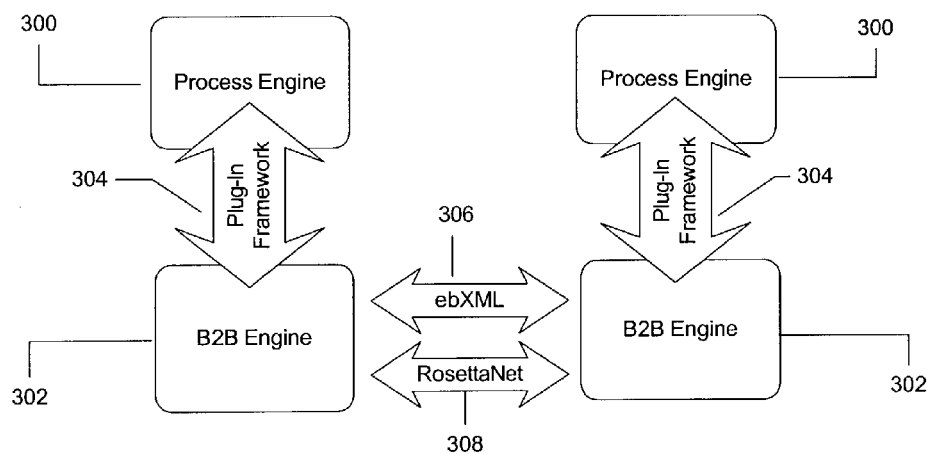
FIG. 3 is an illustration of prior art business partner interaction.

FIG. 3 is an illustration of prior art business partner interaction. BEA WebLogic Integration™ software available from BEA Systems, Inc., is a commercial implementation of such a system. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such objects, irregardless of how they are combined or divided, can execute on the same computing device or can be arbitrarily distributed among different computing devices connected by a network.

Process engine 300 communicates with B2B engine 302 through plug-in framework 304. The B2B engine enables workflows executing in the process engine to communicate/collaborate with other business partners' process engines. In one embodiment, the plug-in framework can include an API (application program interface) which is used by the process engine and an SPI (service provider interface) which is implemented by the B2B engine. In another embodiment, the plug-in framework can include a communication protocol through which the process engine and the B2B engine communicate. In yet another embodiment, the process engine and the B2B engine reside on different computing devices yet communicate through the plug-in framework.

In one embodiment, the B2B engine processes and routes business messages among business partners at run time. The contents and format of a business message can depend on the protocol chosen for the conversation. The protocol specifies the structure of business messages, how to process the messages, and how to route them to the appropriate recipients. A protocol may also specify characteristics of messages related to persistence and reliability. In one embodiment, a business partner may also implement process engine 300 and B2B engine 302. In another embodiment, a business partner need only support the particular protocol used by the B2B engine which initiates the conversation.

The B2B engine includes support for a number of protocols, including but not limited to RosettaNet 308 and ebXML 306. RosettaNet is a self-funded, nonprofit consortium of major companies working to create and implement industry-wide, open e-business process standards (see http://www.rosettanet.org.). These standards form a common e-business language, aligning processes between supply chain partners on a global basis. To support its mission, RosettaNet provides specifications for the RosettaNet Implementation Framework (RNIF), the Partner Interface Processes (PIPs), and business and technical dictionaries.

The ebXML Message Service Specification, which defines the message enveloping and header document schema used to transfer ebXML messages with a communication protocol such as HTTP. In addition, one embodiment supports the creation and execution of workflows that model ebXML business messages. The ebXML Message Service Specification is a set of layered extensions to the base Simple Object Access Protocol (SOAP) and SOAP Messages with Attachments specifications. The ebXML Message Service provides security and reliability features that are not provided in the specifications for SOAP and SOAP Messages with Attachments (see http://www.ebxml.org).

The B2B engine can communicate a business message to another business partner within the context of a transaction. A transaction specifies a series of actions that must be completed successfully or, in the case of failure, must be undone such that any data that was modified by the transaction is returned to its pre-transaction state. If a transaction succeeds, it is committed. Commitment of a transaction means that any changes to data made therein will survive a system failure.

Figure 4:
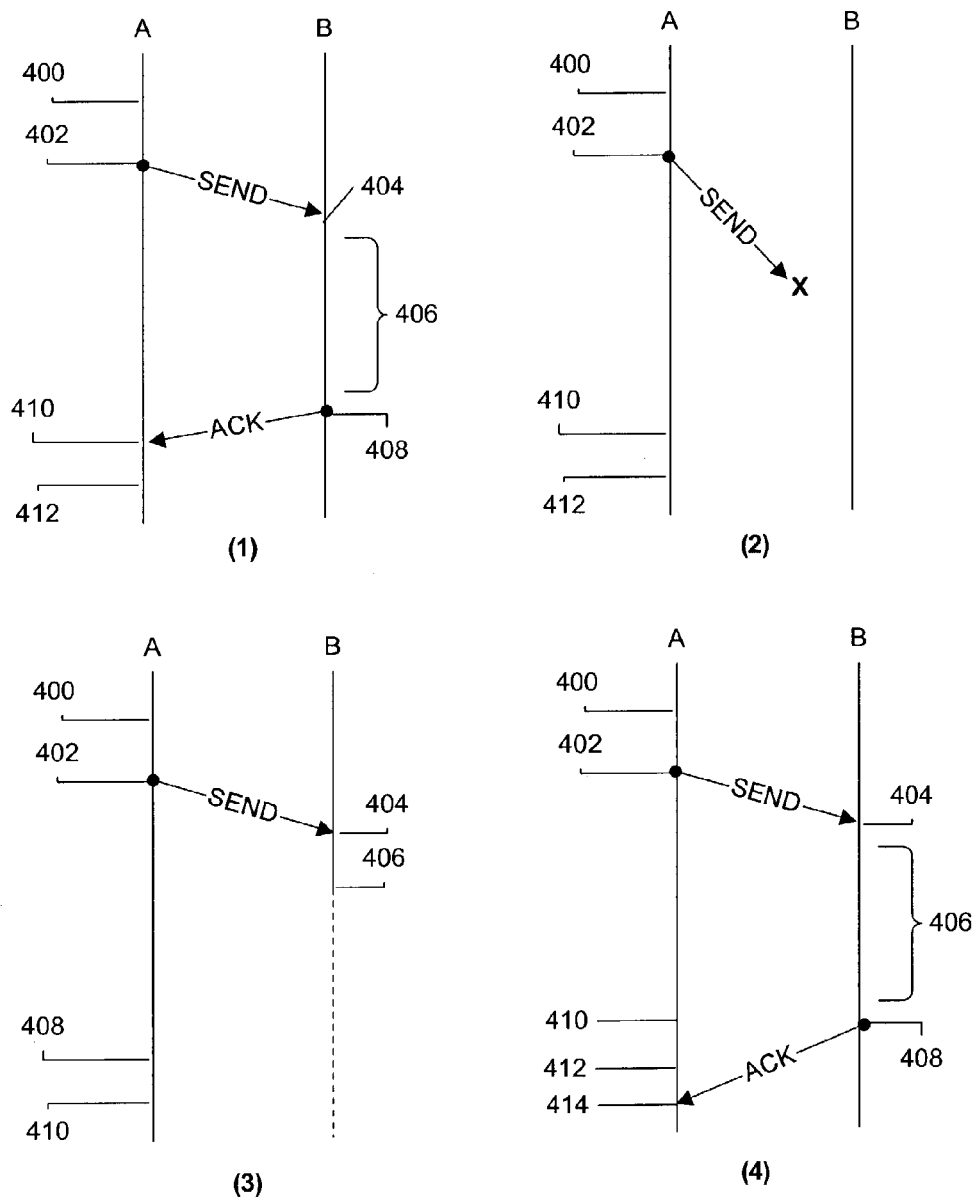
FIG. 4 is an illustration of prior art B2B engine transaction scenarios.

FIG. 4 is an illustration of prior art B2B engine transaction scenarios. Each scenario in the figure is labeled with a scenario number in parenthesis. In each scenario, "A" and "B" represent two different business partners which may or may not be executing on the same computing device. The vertical lines represent time wherein time increases down the page. Scenario (1) illustrates a successful transaction. A begins a new transaction at time 400. At time 402, A sends a message to B. B receives the message at time 404, processes the message during time span 406, and sends an acknowledgement at time 408. After sending the message to B, A waits for an acknowledgment from B (e.g., event node 222 in FIG. 2). In one embodiment, an acknowledgement is an HTTP status message. A receives the acknowledgement at time 410 and commits the transaction at time 412. The duration of A's transaction is from time 400 to time 412. This time span can be very long, depending on how responsive B is.

To ensure reliability, a transaction can lock resources during its lifespan to prevent other threads of execution from changing them before the transaction has committed its own changes. However, if the transaction endures for a long period of time, the other threads of execution must wait until the transaction unlocks the resources before they can complete their work. Thus, long transactions can introduce bottlenecks by holding onto resources needed by other threads/transactions. In addition to this problem, if A and B happen to be dependent on the same shared resources, a deadlock can arise. A deadlock is a situation where two (or more) threads of execution cannot proceed because each is terminally waiting for the other to do something, such as releasing a lock on a shared resource. For example, a deadlock will arise if B needs to access resources A has locked. This can occur in practice when A and B are co-located on the same computing device (e.g., when they are on the same server using the same database).

Scenario (2) in FIG. 4 illustrates a send failure. At time 400, A commences a transaction. At time 402 A sends a message to B, however the message never reaches B. This could be due to a network failure of some sort. As a consequence, A waits until a message acknowledgement time-out occurs at time 410. The transaction then fails at time 412. A's transaction cannot complete until either it receives a message from B or it fails as a result of a time-out. As with scenario (1), other processes/transactions are prevented from accessing resources locked by A until A's transaction fails.

Scenario (3) in FIG. 4 illustrates a system failure of B. The failure could be due to a hardware fault, software bug, or any combination of the two. As with the previous scenarios, at time 400 A begins a new transaction. A sends B a message at time 402 which B receives at time 404. Before acknowledging the transaction, B experiences a failure at time 406. As a result, A never receives an acknowledgment from B and the transaction remains open until a time-out occurs at time 408. The transaction then fails at time 410.

Scenario (4) in FIG. 4 illustrates an acknowledgement failure. At time 400, A commences a transaction. Within that transaction at time 402, A sends a message to B. B receives the message at time 404 and processes it until during time span 406. A waits until a message acknowledgement time-out occurs at time 410. At time 408, B sends an acknowledgement to A, but it is received after A's transaction fails at time 412. Thus, even though the message was transferred successfully from B's point-of-view, A's transaction has nonetheless failed. As a result of the transaction failure, A can try to re-execute the transaction. However, this will cause a second (duplicate) message to be sent to B which itself may introduce an error at B unless B can recognize the message as such and provide an acknowledgement to A.

Figure 5:
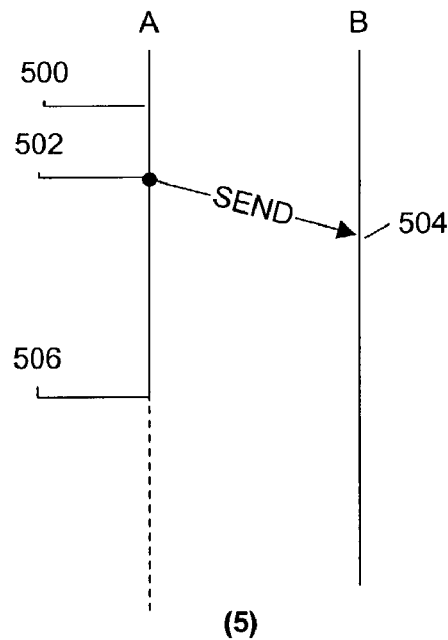
FIG. 5 is an illustration of an additional prior-art B2B engine transaction scenario.

FIG. 5 is an illustration of an additional prior-art B2B engine transaction scenario. Scenario (5) illustrates a scenario in which A's system fails. The failure could be due to a hardware fault, software bug, or any combination of the two. At time 500, A begins a new transaction. A time 502, A sends a message to B which B receives at time 504. Before A can receive a response from B, A fails at time 506. Since A's transaction also fails as a result, A can try to re-execute it when A is no longer in a fail state. As with Scenario (4), this can cause a second (duplicate) message to be sent to B which may introduce an error at B.

Figure 6:
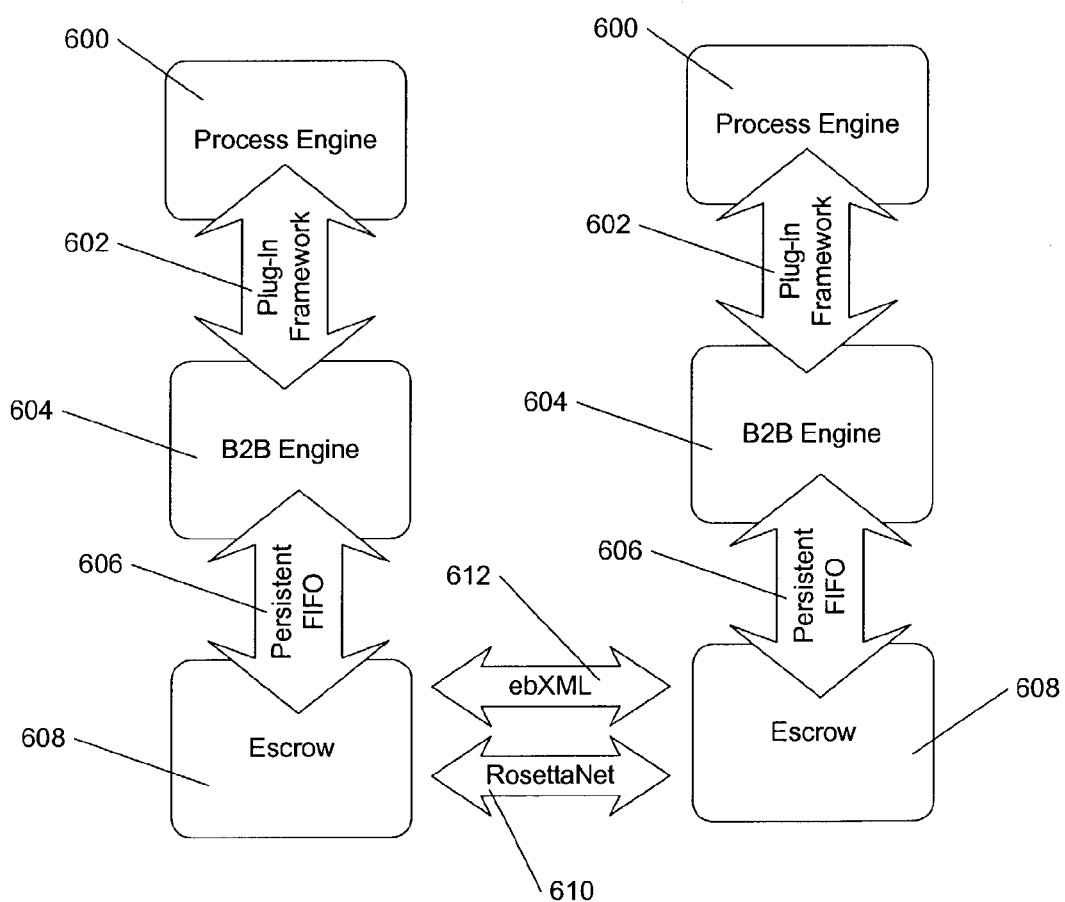
FIG. 6 is a modified system in accordance to one embodiment and by way of illustration.

The problems exhibited in scenarios (1)-(5) can be remedied in one embodiment by excluding message sending from A's transaction. FIG. 6 is a modified system in accordance to one embodiment and by way of illustration. To process engine 600, plug-in framework 602 and B2B engine 604, a persistent FIFO (first in, first out queue) 606 and an escrow process 608 have been added. In this embodiment, the B2B engine is no longer response for sending messages and receiving acknowledgments. This is undertaken by the escrow process and performed outside of the primary transaction. When the B2B engine undertakes routing a business messages to a business partner, it transfers the message to the persistent FIFO. The persistent FIFO will persist the message—even across system failures—until the escrow process removes it. In one embodiment, the persistent FIFO is implemented as a JMS message queue. In another embodiment, the persistent FIFO can be implemented by an Enterprise JavaBean™ (available from Sun Microsystems, Inc.) or any other approach that can provide persistent storage. The escrow process attempts to send the message at the head of the FIFO to its destination via a protocol such as ebXML 612 or RosettaNet 610. If the message send fails for some reason (e.g., scenarios (2)-(5)), the escrow process can retry until successful. Once a message has been successfully sent (e.g., an acknowledgement is received before a time-out occurs), the escrow process can remove the message from the FIFO. In this way, messages are never taken from persistent storage until the have been successfully transferred.

Figure 7:
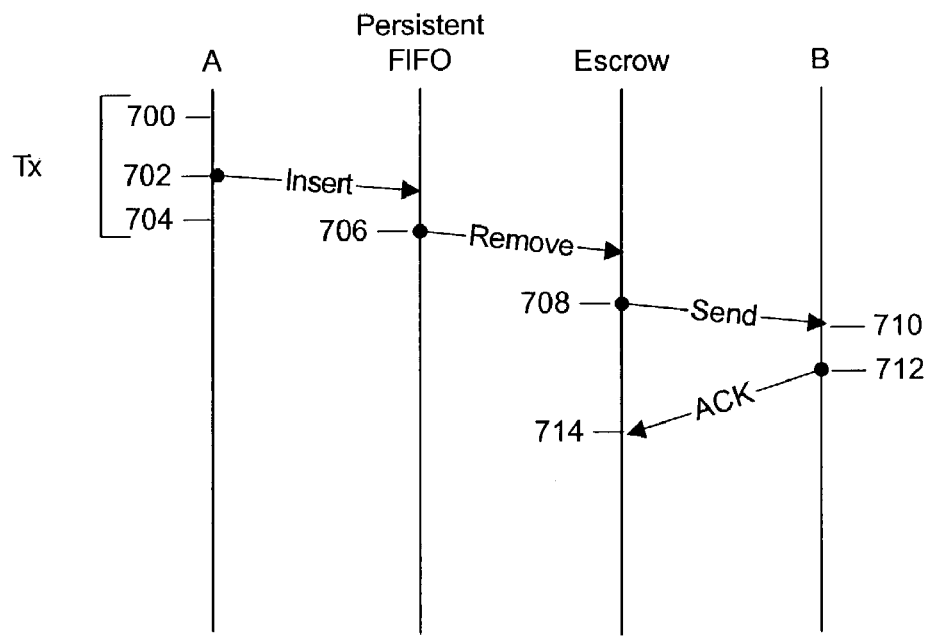
FIG. 7 is an illustration of how a transaction can be structured to take advantage of the system of FIG. 6 and thus avoid delays and deadlocks

FIG. 7 is an illustration of how a transaction can be structured to take advantage of the system of FIG. 6 and thus avoid delays and deadlocks. At time 700, A begins a new transaction. At time 702, A provides a business message to a persistent FIFO 606. Rather than wait for the message to be sent to B (or for the acknowledgment to be received), A simply commits the transaction at time 704. This releases any resources locked by the transaction for use by other threads of execution/transactions. Escrow process 608 removes the message from the FIFO at time 706. Once A has provided the message to the FIFO, the message is no longer considered within A's transaction. The escrow process sends the message to B at time 708. B receives the message at time 710 and sends an acknowledgment to the escrow process at time 712. The escrow process receives the acknowledgment at time 714.

In one embodiment, if the send fails to reach B due to a system failure on A or a transmission error, the escrow process can re-send the message. The message is not lost due to the persistent FIFO. When the escrow process receives the acknowledgment at time 714, it can remove the original message from the persistent FIFO. If the escrow process times-out before receiving an acknowledgment from B, it can resend the message. In one embodiment, B can implement duplicate message detection to filter out any duplicate messages that are sent by the escrow process.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for performing a transaction including delivering messages, said method comprising:

establishing a conversation between two or more applications, wherein the conversation defines two or more roles for the applications, and wherein the conversation is further associated with a unique name and version;

initiating a transaction by a first workflow process, said transaction including a message addressed to a second workflow process; wherein the first workflow process and the second workflow process implement said roles of the conversation;

storing the message by the first workflow process into a persistent queue and committing said transaction by the first workflow process after the message has been persisted such that any resources locked by the transaction are released for use by other transactions;

retrieving the message from the queue by an escrow process that is external with respect to the first workflow process;

transmitting the message from the escrow process to the second workflow process wherein the transmission of the message occurs outside of said transaction;

wherein if the first workflow process abnormally terminates after the message has been stored in the persistent queue, the escrow process will continue attempting to deliver the message to the second workflow process unaffected by termination of the first workflow process; and receiving, by the escrow process, an acknowledgement of receiving the message at the second workflow process and removing the message from the queue by the escrow process if the acknowledgement is received before the escrow process times out;

wherein in the event that the escrow process times out before the acknowledgement is received, the escrow process re-transmits the message to the second workflow process, wherein the second workflow process implements duplicate message detection to filter out duplicate messages sent by the escrow process.

2. The method of claim 1 wherein:
the workflow process is an instantiated workflow template.

3. The method of claim 2 wherein:
a workflow template is a sequence of one or more tasks derived from a graphical representation of the tasks.

4. The method of claim 1 wherein:
the transaction is a set of one or more operations that are rolled-back in the event that the transaction does not complete.

5. The method of claim 1 further comprising:
a protocol employed to transmit the message, wherein said protocol is one of: 1) ebXML;
and 2) RosettaNet.

6. The method of claim 1 wherein:
the message is based on Extensible Markup Language (XML).

7. The method of claim 1 wherein:
the transaction holds an exclusive lock on a set of shared resources.

8. The method of claim 1 wherein:
the first workflow process and the second process both execute on the same computing device.

9. A system for performing a transaction including delivering a message, said system comprising:
one or more processors; and
physical memory encoded with instructions, said instructions being executed by the one or more processors and causing the one or more processors to perform the steps of:

establishing a conversation between two or more applications, wherein the conversation defines two or more roles for the applications, and wherein the conversation is further associated with a unique name and version;

initiating a transaction by a first workflow process, said transaction including a message addressed to a second workflow process; wherein the first workflow process and the second workflow process implement said roles of the conversation;

storing the message by the first workflow process into a persistent queue and committing said transaction by the first workflow process after the message has been persisted such that any resources locked by the transaction are released for use by other transactions;

retrieving the message from the queue by an escrow process that is external with respect to the first workflow process;

transmitting the message from the escrow process to the second workflow process wherein the transmission of the message occurs outside of said transaction;

wherein if the first workflow process abnormally terminates after the message has been stored in the persistent queue, the escrow process will continue attempting to deliver the message to the second workflow process unaffected by termination of the first workflow process; and receiving, by the escrow process, an acknowledgement of receiving the message at the second workflow process and removing the message from the queue by the escrow process if the acknowledgement is received before the escrow process times out;

wherein in the event that the escrow process times out before the acknowledgement is received, the escrow process re-transmits the message to the second workflow process, wherein the second workflow process implements duplicate message detection to filter out duplicate messages sent by the escrow process.

10. The system of claim 9 wherein:
the workflow process is an instantiated workflow template.

11. The system of claim 10 wherein:
a workflow template is a sequence of one or more tasks derived from a graphical representation of the tasks.

12. The system of claim 9 wherein:
the first transaction is an set of one or more operations that can be rolled-back in the event that the first transaction does not complete.

13. The system of claim 9 further comprising:
a protocol employed to transmit said message, wherein said protocol is one of: 1) ebXML;
and 2) RosettaNet.

14. The system of claim 9 wherein:
the message is based on Extensible Markup Language (XML).

15. The system of claim 9 wherein:
the transaction holds an exclusive lock on a first set of shared resources.

16. The system of claim 9 wherein:
the first workflow process and the second process both execute on the same computing device.

17. A computer readable storage medium carrying one or more sequences of instructions, said instructions when executed by one or more processors, causing the one or more processors to perform the steps of:

establishing a conversation between two or more applications, wherein the conversation defines two or more roles for the applications, and wherein the conversation is further associated with a unique name and version;

initiating a transaction by a first workflow process, said transaction including a message addressed to a second workflow process; wherein the first workflow process and the second workflow process implement said roles of the conversation;

storing the message by the first workflow process into a persistent queue and committing said transaction by the first workflow process after the message has been persisted such that any resources locked by the transaction are released for use by other transactions;

retrieving the message from the queue by an escrow process that is external with respect to the first workflow process;

transmitting the message from the escrow process to the second workflow process wherein the transmission of the message occurs outside of said transaction;

wherein if the first workflow process abnormally terminates after the message has been stored in the persistent queue, the escrow process will continue attempting to deliver the message to the second workflow process unaffected by termination of the first workflow process; and receiving, by the escrow process, an acknowledgement of receiving the message at the second workflow process and removing the message from the queue by the escrow process if the acknowledgement is received before the escrow process times out;

wherein in the event that the escrow process times out before the acknowledgement is received, the escrow process re-transmits the message to the second workflow process, wherein the second workflow process implements duplicate message detection to filter out duplicate messages sent by the escrow process.

18. The method of claim 1, further comprising:

detecting one or more duplicate messages from the escrow process by the second workflow process and filtering out said one or more duplicate messages at the second workflow process.

19. The method of claim 1, wherein the FIFO queue persists the message across system failures until the escrow process removes it, such that messages are never taken from persistent storage until said messages have been successfully transmitted to the second workflow.

\* \* \* \* \*

UNITED STATES PATENT AND TRADEMARK OFFICE
CERTIFICATE OF CORRECTION

| | |
|---|---|
| PATENT NO. | : 8,170,896 B2 |
| APPLICATION NO. | : 10/428880 |
| DATED | : May 1, 2012 |
| INVENTOR(S) | : Mangtani et al. |

It is certified that error appears in the above-identified patent and that said Letters Patent is hereby corrected as shown below:

In the drawings: on sheet 2 of 6, in figure 2, Box No. 204, line 2, delete "Messge" and insert -- Message --, therefor.

In column 1, line 61, after "deadlocks" insert -- . --.

In column 7, line 64, delete "the" and insert -- they --, therefor.

In column 12, line 19, in Claim 19, after "the" delete "FIFO".

Signed and Sealed this
Thirty-first Day of July, 2012

David J. Kappos
*Director of the United States Patent and Trademark Office*